US007912297B2

(12) United States Patent
Jung et al.

(10) Patent No.: US 7,912,297 B2
(45) Date of Patent: Mar. 22, 2011

(54) METHOD OF INDEXING IMAGE HIERARCHICALLY AND APPARATUS THEREFOR

(75) Inventors: Choon-sik Jung, Gyeonggi-do (KR); Cheul-hee Hahm, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 2134 days.

(21) Appl. No.: 10/127,547

(22) Filed: Apr. 23, 2002

(65) Prior Publication Data
US 2003/0067479 A1 Apr. 10, 2003

(30) Foreign Application Priority Data
Sep. 27, 2001 (KR) .................. 2001-60133

(51) Int. Cl.
*G06K 9/68* (2006.01)
(52) U.S. Cl. ........ 382/227; 382/224; 382/226; 348/700; 386/241
(58) Field of Classification Search ................ 386/1, 33, 386/45, 46, 52–55, 64, 69, 70, 125, 126, 386/77, 83, 239, 241, 248; 348/700, 701; 715/723–726, 255; 706/14; 382/165, 170, 382/171, 173, 224, 226; 709/224
See application file for complete search history.

(56) References Cited

U.S. PATENT DOCUMENTS

| | | | | |
|---|---|---|---|---|
| 5,532,833 A * | 7/1996 | Hong et al. | ...................... | 386/77 |
| 5,537,528 A * | 7/1996 | Takahashi et al. | ............ | 715/255 |
| 5,771,330 A * | 6/1998 | Takano et al. | ................... | 386/52 |
| 5,901,289 A * | 5/1999 | Leonard et al. | ............... | 709/224 |
| 5,956,026 A * | 9/1999 | Ratakonda | ...................... | 715/723 |
| 5,956,453 A * | 9/1999 | Yaegashi et al. | ................ | 386/52 |
| 6,072,861 A * | 6/2000 | Yu | ............................... | 379/93.24 |
| 6,173,275 B1 * | 1/2001 | Caid et al. | ........................ | 706/14 |
| 6,411,771 B1 * | 6/2002 | Aotake | ........................... | 386/52 |
| 6,414,954 B1 * | 7/2002 | Miyamoto | .................... | 370/389 |
| 6,606,411 B1 * | 8/2003 | Loui et al. | ...................... | 382/224 |
| 6,690,878 B1 * | 2/2004 | Jeong et al. | ..................... | 386/52 |
| 7,042,525 B1 * | 5/2006 | Yu | ................................. | 348/700 |
| 2002/0053090 A1 * | 5/2002 | Okayama et al. | ............. | 725/152 |
| 2003/0059107 A1 * | 3/2003 | Sun et al. | ..................... | 382/165 |
| 2003/0177503 A1 * | 9/2003 | Sull et al. | ..................... | 725/112 |

FOREIGN PATENT DOCUMENTS

| | | |
|---|---|---|
| CN | 1090113 A | 7/1994 |
| CN | 1222814 A | 7/1999 |
| CN | 1264120 A | 8/2000 |
| JP | 10-257436 * | 9/1998 |

* cited by examiner

*Primary Examiner* — Thai Tran
*Assistant Examiner* — Mishawn Dunn
(74) *Attorney, Agent, or Firm* — Staas & Halsey LLP

(57) ABSTRACT

A method of hierarchical image indexing which extracts representative images of a TV program and generates a hierarchical index image guide of the representative images, and an apparatus therefor. Respective images at predetermined times are extracted from a predetermined program. A hierarchical index is allocated to each extracted image and the indexes are mapped to locations of transport stream packets. A tree of images having the allocated indexes is constructed as a hierarchically indexed Image guide (HIIG). When a stored program is to be reproduced, a location desired to be watched is selected in the HIIG, and from the selected location, reproducing and trick plays (FF, rewind) are enabled such that a user easily searches the program and begins viewing the program at the searched for location.

19 Claims, 6 Drawing Sheets under patent

METHOD OF INDEXING IMAGE HIERARCHICALLY AND APPARATUS THEREFOR

This application claims the benefit of Korean Application No. 2001-60133 filed Sep. 27, 2001, in the Korean Patent Office, the disclosure of which is incorporated herein by reference.

BACKGROUND OF THE INVENTION

1. Field of the Invention

The present invention relates to a personal video recorder system, and more particularly, to a method of hierarchical image indexing which extracts representative images of a TV program and generates a hierarchical index image guide, and an apparatus therefor.

2. Description of the Related Art

In general, a digital broadcasting receiving system receives a digital broadcast, and stores and reproduces audio/video data.

FIG. 1 is a block diagram of a digital broadcast receiving and/or reproducing system. The digital broadcasting receiving and/or reproducing system of FIG. 1 has a Transport Stream (TS) demultiplexer (demux) unit 120 which demultiplexes an Audio/Video elementary stream, a storage unit 160 which stores transport packets of a TV program, a digital interface unit 150 which transmits a transport packet to the storage unit 160 or receives a transport packet from the storage unit 160, an audio decoder 140 which decodes an audio stream output from the TS demux unit 120, a video decoder 150 which decodes a video stream output from the TS demux unit 120, and a control unit 110 which controls each unit.

Referring to FIG. 1, in the TS demux unit 120 a received transport stream packet is demultiplexed into a partial transport stream of a TV program to be stored. The partial transport stream packet is sent through the digital interface unit 150 and stored with time information in the storage unit 160. When the TV program is reproduced, the partial transport stream packet stored in the storage unit 160 is input to the TS demux unit 120 through the digital interface unit 150. The partial transport stream packet is output as an audio elementary stream and a video elementary stream from the TS demux unit 120. The audio and video elementary streams are decoded in the audio decoder 130 and the video decoder 140, respectively.

However, when the TV program is reproduced, the prior art digital broadcasting receiving and/or reproducing system of FIG. 1 has no information indicating a scene which a TV viewer wants to watch, or a location of the scene. Therefore, the system performs only simple reproduction or a trick play (for example, Fast Forward (FF) or rewind).

Accordingly, with the prior art digital broadcasting receiving system, TV viewers must identify each scene, which they want to watch, by using a FF function or a rewind function.

SUMMARY OF THE INVENTION

To solve the above problems, it is an object of the present invention to provide a method of hierarchical image indexing which, when a user stores a predetermined program or a TV program broadcast for reproduction at an arbitrary time, generates a hierarchical index by extracting representative images of the program that is input and stored.

It is another object of the present invention to provide a method of hierarchical index image reproducing which enables a program viewer to reproduce and trick reproduce a program from a location of the program which is selected by referring to a hierarchical image indexing structure of the program.

To accomplish the above and other objects of the present invention, a method of image indexing for recording and/or reproducing an image includes extracting an image at each of a plurality of predetermined times from a predetermined program; allocating a hierarchical index to each extracted image and mapping the indexes to corresponding locations of transport stream packets; and constructing a tree of images having the allocated indexes.

Additional objects and advantages of the invention will be set forth in part in the description which follows, and, in part, will be obvious from the description, or may be learned by practice of the invention.

To accomplish the above and other objects of the present invention a method of reproducing a program having a hierarchical image index includes decoding upper layer pictures of the program to be reproduced and displaying the pictures with corresponding upper layer index numbers and if a predetermined picture among the displayed upper layer pictures is selected, decoding the selected picture and displaying the picture with pictures corresponding to a lower layer index number; determining a reproducing time, using the index number of the picture selected among the displayed pictures; detecting a transport stream packet based on the determined reproducing time; and decoding an audio/video signal beginning with the detected transport stream packet.

Also, to accomplish the above and other objectives of the present invention, an image indexing apparatus in a system for recording and/or reproducing an image having a storage unit which stores a program in units of transport stream packets is provided. In the image indexing apparatus, a Transport Stream (TS) demultiplexing unit demultiplexes the transport stream packets into audio streams and video streams; a decoder unit decodes the audio streams and video streams that are demultiplexed in the TS demultiplexing unit into audio data and video data; a picture codec unit encodes predetermined picture data among pictures decoded in the decoder unit if an operation mode is a store mode, and decodes the picture data stored in the storage unit if the operation mode is a reproducing mode; and a microprocessor unit stores picture data encoded in the picture codes unit and hierarchically indexes the picture data at each predetermined time if the operation mode is a store mode, and hierarchically displays the picture data stored in the storage unit on a screen and a outputs transport stream packet based on the selected picture data to the TS demultiplexing unit if the operation mode is a reproducing mode.

BRIEF DESCRIPTION OF THE DRAWINGS

The above and other objects and advantages of the present invention will become more apparent by describing in detail preferred embodiments thereof with reference to the accompanying drawings in which.

DESCRIPTION OF THE PREFERRED EMBODIMENTS

Figure 1:
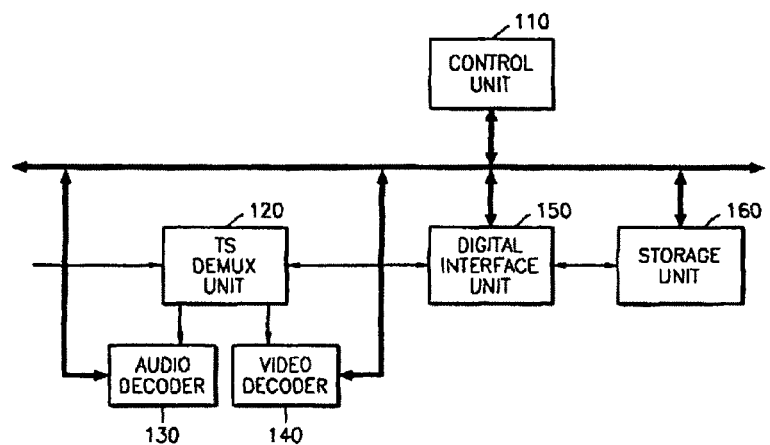
FIG. 1 is a block diagram of a conventional digital broadcast receiving and/or reproducing system.

Reference will now be made in detail to the present embodiments of the present invention, examples of which are illustrated in the accompanying drawings, wherein like reference numerals refer to like elements throughout.

Figure 2:
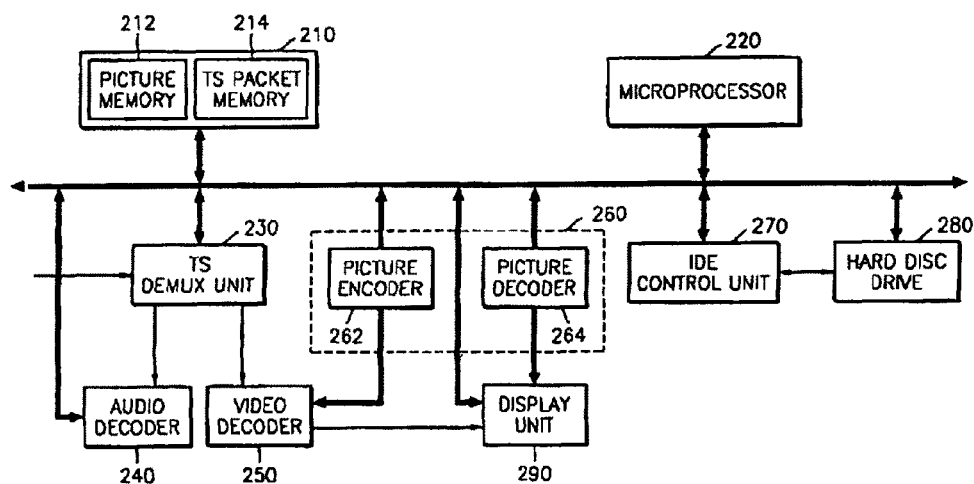
FIG. 2 is a block diagram of a digital broadcasting receiving and/or reproducing system according to an embodiment of the present invention.

Referring to FIG. 2, a broadcasting receiving and/or reproducing system according to an embodiment of the present invention will be described. A memory is formed with a TS packet memory 214 and a picture memory 212. The TS packet memory 214 temporarily stores a stream which is demultiplexed in the TS demux unit 230, and the picture memory 212 temporarily stores picture data encoded in a picture encoder 262.

The TS demux unit 230 demultiplexes a TS stream into audio and video elementary streams. An audio decoder 240 and a video decoder 250 decode the audio stream and the video stream, respectively.

An Integrated Development Environment (IDE) control unit 270 controls an interface between a data bus of a microprocessor 220 and a Hard Disc Driver (HDD) 280.

A picture codec unit 260 is formed with a picture encoder 262 and a picture decoder 264. The picture codec unit 260 encodes or decodes picture data in order to store the picture data in the HDD 280 or display the picture data on a screen. That is, the picture encoder 262 encodes given picture data among picture data decoded in a video decoder 250 to store the given picture data in the HDD 280, and the picture decoder 264 decodes compressed picture data which is stored in the picture memory 212 through the HDD 264. A display unit 290 includes the screen to display an image decoded in the video decoder 250 and the picture decoder 264.

The microprocessor 220 stores the program and hierarchical index images in the HDD 280, and using the hierarchical index images, controls reproduction and trick reproduction. The microprocessor 220 controls the TS demux unit 230, the audio decoder 240, the video decoder 250, the IDE control unit 270, and the picture codec unit 260. In particular, the microprocessor 220 provides Direct Memory Access (DMA) to store TS packets and picture data stored in the memory 210, in the HDD 280.

Figure 3:
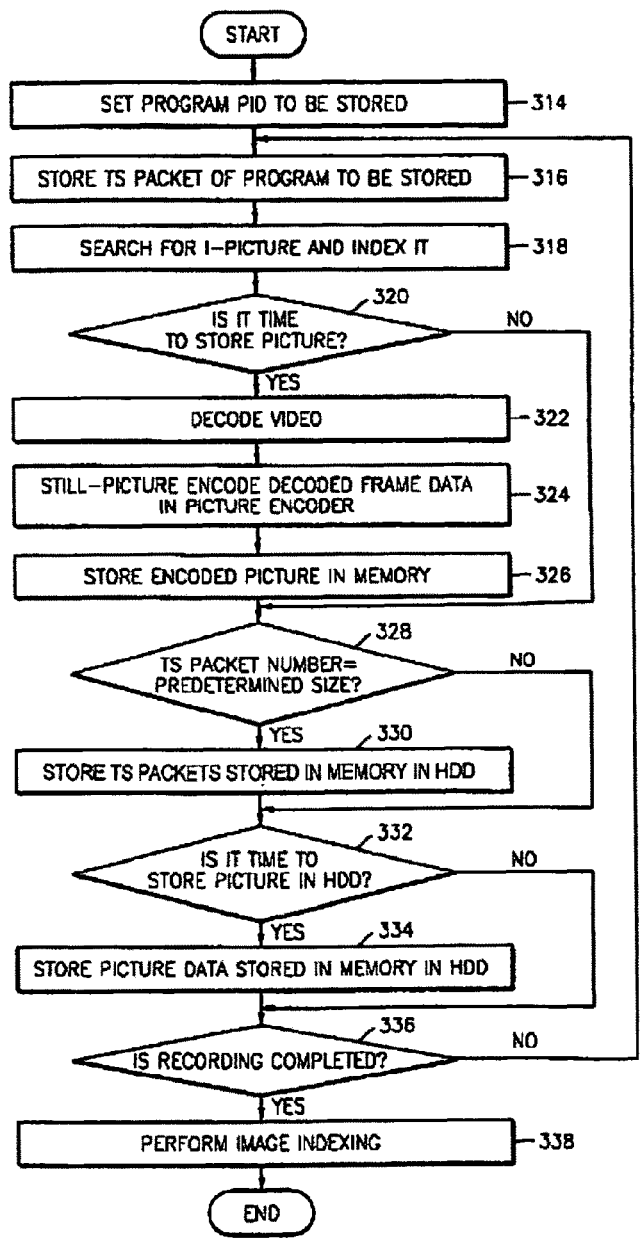
FIG. 3 is a flowchart for showing a method of hierarchical image indexing in the digital broadcasting receiving and/or reproducing system of FIG. 2.

FIG. 3 is a flowchart for showing a method of hierarchical image indexing in the digital broadcasting receiving and/or reproducing system of FIG. 2.

A Packet IDentifier (PID) of the program to be stored is set in operation 314. Then, the TS packet of the program is stored in the TS packet memory 210 through the TS demux unit 230 in operation 316. Input TS packets are searched for an Intra-picture (I-picture) and an index number is given to the I-picture in operation 318. It is determined whether it is a time to store the I-picture in operation 320. If it is not time to store a picture, the method advances to operation 328 as described below. If it is time to store the I-picture, a video stream of the selected program, the video stream corresponding to the I-picture, is input to the video decoder 250 and decoded into frame data in operation 322.

Next, the decoded frame data is encoded into a still image in the picture encoder 262 in operation 324. Picture data corresponding to the encoded still image is stored in the picture memory 212 in operation 326. A number of TS packets stored in the TS packet memory 214 is compared with a predetermined size in operation 328. If the two numbers are the same, the TS packets stored in the TS packet memory 214 are stored in the HDD 280 in operation 330. If the number of TS packets is not the predetermined size, the method advances to operation 332 as described below.

It is determined whether it is time to store the encoded still image picture data in the HDD 280 in operation 332. If it is time to store the encoded still image picture data in the HDD 280, the encoded still image picture data stored in the picture memory 212 is stored in the HDD 280 in operation 334. If it is not time to store the still image picture data in the HDD 280, the method advances to operation 336 as described below.

It is determined whether recording of the program unit is completed in operation 336. If the recording is completed, an image indexing routine is performed and a Hierarchically Indexed Image Guide (HIIG) is generated in operation 338, and otherwise operations 316 through 336 are repeated until the recording is completed.

Figure 4:
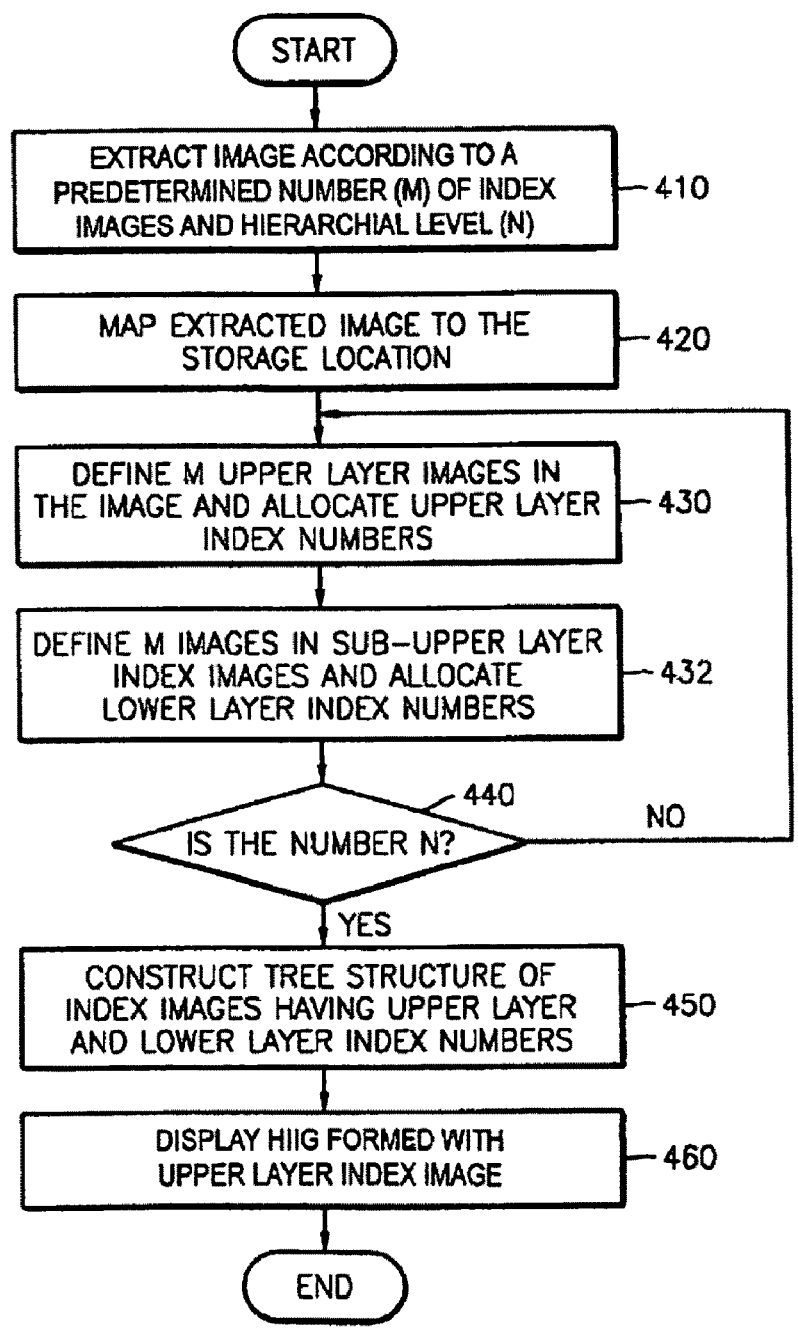
FIG. 4 is a flowchart of an image indexing process of FIG. 3.

FIG. 4 is a detailed flowchart of an image indexing process of FIG. 3.

First, using a number (M) of index images at each level defined by a user and a hierarchical level (N), an image is extracted from the HDD 280 in operation 410. The extracted image is mapped to a location (a disc packet number) of the TS packet stored in the HDD 280 in operation 420. M upper layer images are defined in the extracted image, and upper layer index numbers are allocated in the M upper layer images and mapped to the location stored in the HDD 280 in operation 430.

Then M images are defined in the sub-upper layer index image and lower layer index numbers are allocated and mapped to the location of the TS packet stored in the HDD 280 in operation 432. This process is repeated to the lowest level in operation 440. Then an image signal having an upper layer index number and a lower layer index number is constructed to have a tree structure in operation 450.

Next, the HIIG formed with an index image is displayed on the screen of the display unit 290.

Figure 5:
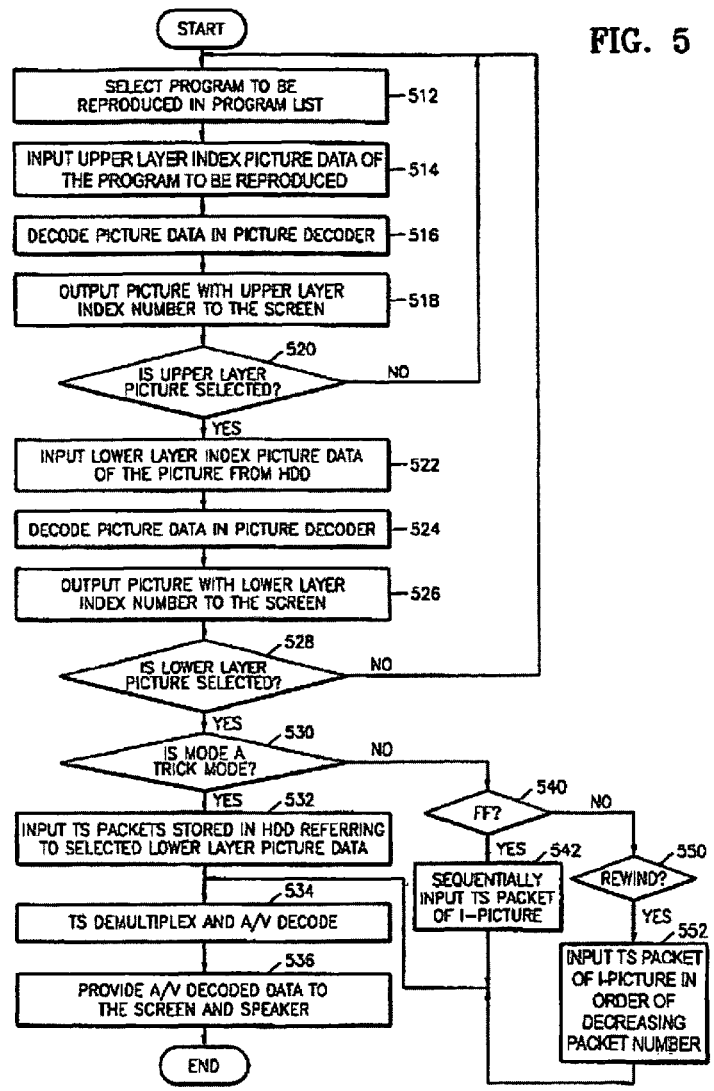
FIG. 5 is a flowchart for showing a method of hierarchical image indexing in the digital broadcasting receiving and/or reproducing system of FIG. 2.

FIG. 5 is a flowchart for showing a method of hierarchical image indexing in the digital broadcasting receiving and/or reproducing system of FIG. 2.

First, a program to be reproduced is selected in a program list in operation 512. Upper layer index picture data of the program to be reproduced is extracted from the HDD 280, input and temporarily stored in the picture memory in operation 514. The picture data stored in the picture memory 212 is decoded in the picture decoder 264 in operation 516. The picture data with the upper index number is output on the screen of display unit 290 in operation 518. It is determined whether the upper layer picture is selected in operation 520. If the upper layer picture is selected, the lower layer index picture data of the picture is extracted from the HDD 280, input and temporarily stored in the picture memory 212 in operation 522.

The picture data stored in the picture memory 212 is decoded in the picture decoder 264 in operation 524. The decoded picture with the lower layer index number is displayed on the screen of the display unit 290 in operation 526. It is determined whether the lower layer picture is selected in operation 528. If the lower layer picture is selected, it is determined whether an operation mode is a trick mode in operation 530. If the operation mode is not the trick mode, using the selected lower layer picture data, corresponding TS packets stored in the HDD 280 are extracted, input and temporarily stored in the TS packet memory 214 in operation 532.

A packet stream, comprising the extracted TS packets which are stored in the TS packet memory 214, is demultiplexed into an audio stream and a video stream in the TS demux unit 230, and the audio stream is decoded into audio data in the audio decoder 240 and the video stream is decoded into video data in the video decoder 250 in operation 534. The decoded audio and video data are provided to the screen of the display unit 290 and to a speaker, respectively, in operation 536.

If it is determined that the operation mode is the trick mode, a track operation corresponding to FF or rewind is performed according to a user selection. That is, if FF is selected in operation 540, TS packets of the I-picture are sequentially TS multiplexed into a packet stream at operation 532 and decoded into audio/video in operation 534. If rewind is selected in operation 550, TS packets of the I-picture are TS multiplexed at operation 552 in order of decreasing disc packet number and decoded into audio/video in operation 534.

Figure 6:
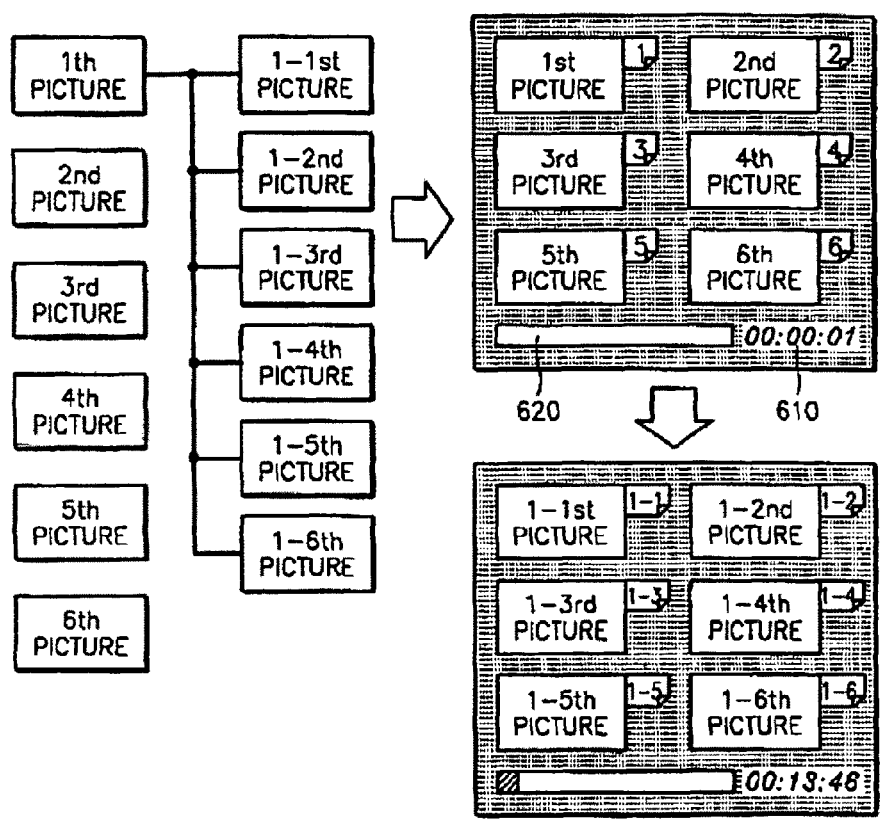
FIG. 6 shows an example of a hierarchical image guide displayed on a screen according to the present invention using symbolic representative images.
Figure 7:
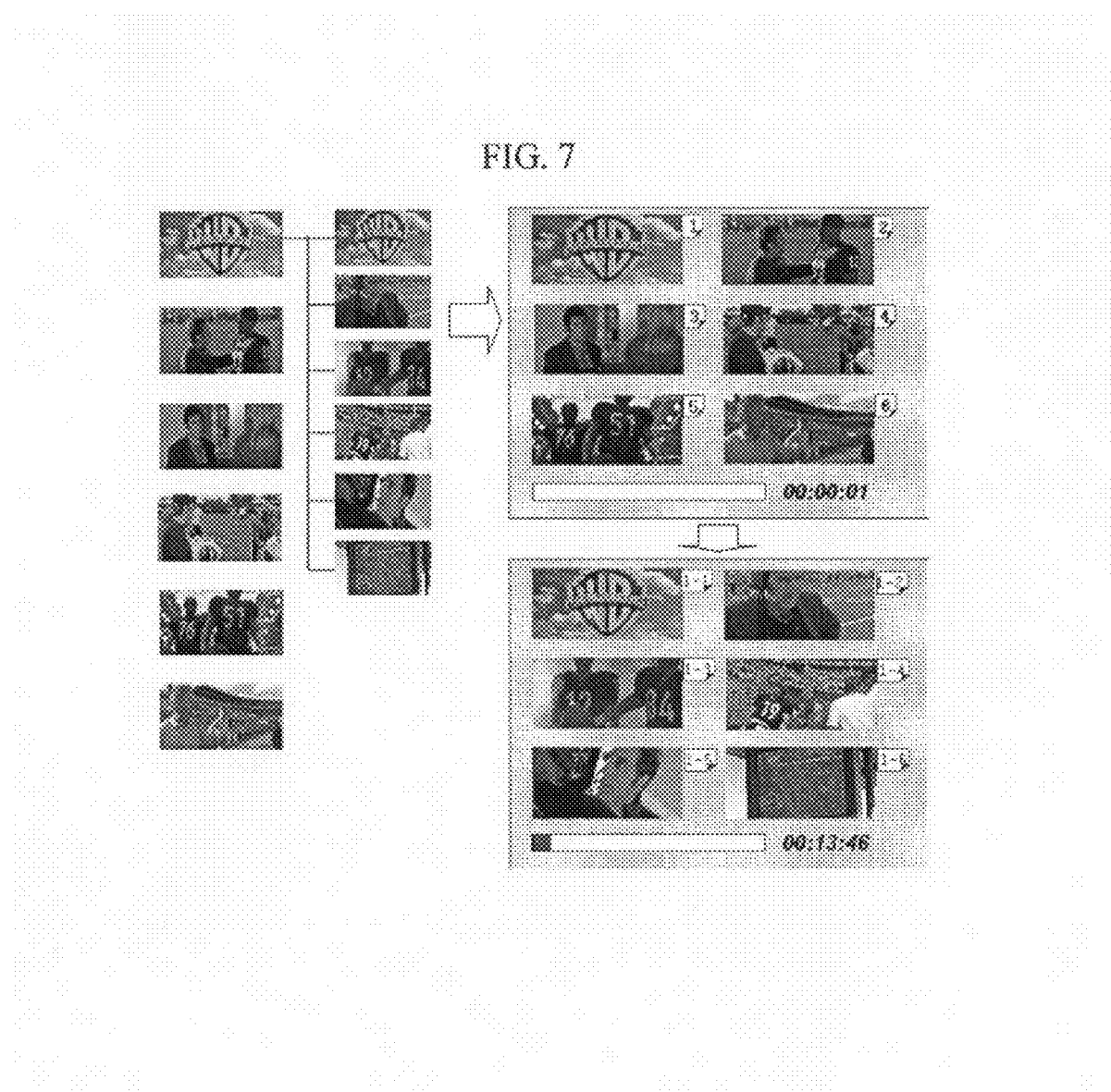
FIG. 7 shows an example of a hierarchical image guide displayed on a screen according to the present invention using realistic representative images.

FIGS. 6 and 7 show examples of hierarchical image guide displayed on a screen according to the present invention.

Referring to FIGS. 6 and 7, a tree structure of images having upper layer index numbers and lower layer index numbers is displayed on the screen. That is, images having upper layer index numbers (1st picture~6th picture) are first displayed on the screen. If an image of which the index number is 1 is selected, images having lower layer index numbers (1-1st picture~1-6th picture) according to the selected upper layer image are displayed first on the screen. A text 610 and/or a graph 620 which indicate a location and time of the selected image in the entire program are displayed.

Although the present invention has been described and explained with respect to a Personal Video Recorder, the present invention is applicable to other systems for recording and reproducing images, in addition to the Personal Video Recorder (PVR) system.

According to the present invention as described above, when a stored program is reproduced, a location desired to watch is selected in the HIIG, and from the location, reproducing and trick plays (FF, rewind) are enabled such that the user easily searches the program and reproduces the program at the desired location.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of image indexing for recording and/or reproducing a predetermined program and reproducing a program having a hierarchical image index, comprising:
   extracting an image at each of a plurality of predetermined times using a hierarchical level of the program;
   automatically allocating a hierarchical index to each extracted image according to the hierarchical level of the program;
   mapping each allocated index to a storage location of a corresponding transport stream (TS) packet of the predetermined program;
   constructing a tree of the extracted images having the allocated hierarchical indexes,
   wherein allocating hierarchical index and mapping each allocated index correlates picture data and the storage location of the TS packets corresponding to the picture data according to one or plurality of index levels which define a reproduction sequence of the TS packets, and
   wherein the allocation of hierarchical index, picture data and TS packets are stored in a storage unit;
   decoding upper layer pictures of the program to be reproduced an displaying the decoded upper level pictures;
   selecting a picture from among the displayed upper layer pictures, decoding lower layer pictures of the selected picture and displaying the selected picture with the lower layer pictures;
   selecting a picture from among the displayed lower layer pictures;
   determining a reproducing time of the selected picture; and
   determining a transport stream packet based on the determined reproducing time, and decoding an audio/video signal of the determined transport stream packet.

2. The method of claim 1, wherein the extracting of each image comprises extracting an Intra-picture (I-picture).

3. The method of claim 1, wherein the allocating of the hierarchical index and the mapping of the allocated indexes comprise:
   extracting an image by using the number of index images and a hierarchical level, and mapping the image to the location of a stored TS packet;
   defining upper layer images;
   allocating upper layer index numbers to the upper layer images, and mapping the upper layer index numbers to the locations of the corresponding TS packets;
   defining sub-upper layer images in the defined upper layer images;
   allocating lower layer index numbers to the sub-upper layer images, and mapping the lower layer index numbers to the locations of the corresponding TS packets; and
   repeating the extracting, defining, allocating and mapping until a predetermined hierarchical level is achieved.

4. The method of claim 1, further comprising:
   displaying at least one of the extracted images and the corresponding hierarchical index of the displayed image.

5. The method of claim 1, further comprising:
   representing the location of the TS packet corresponding to a respective extracted image with a number indicating time information.

6. The method of claim 1, further comprising:
   representing the location of the TS packet corresponding to a respective extracted image with a graph.

7. A method of image indexing for recording and/or reproducing an image, comprising:
   setting a Program IDentifier (PID) of a program and extracting transport stream (TS) packets of the program using a hierarchical level of the program;
   searching the extracted transport stream packets for I-picture data, and decoding the I-picture data;
   encoding the decoded I-picture data as a still picture;
   storing the extracted transport stream packets in a storage unit;
   storing the encoded still picture data and a corresponding time of extraction in the storage unit; and
   automatically allocating hierarchical index numbers to the stored still picture data according to the hierarchical level of the program, and mapping the index numbers to corresponding storage locations of the stored transport stream packets,
   wherein hierarchical index numbers correlate picture data and the storage location of the TS packets corresponding to the picture data according to one or plurality of index levels which define a reproduction sequence of the TS packets, and wherein the hierarchical index numbers, picture data and TS packets are stored in the storage unit;

decoding upper layer pictures of the program to be reproduced an displaying the decoded upper level pictures;

selecting a picture from among the displayed upper layer pictures, decoding lower layer pictures of the selected picture and displaying the selected picture with the lower layer pictures;

selecting a picture from among the displayed lower layer pictures;

determining a reproducing time of the selected picture; and determining a transport stream packet based on the determined reproducing time, and decoding an audio/video signal of the determined transport stream packet.

8. A method of reproducing a program having a hierarchical image index, comprising:

decoding upper layer pictures of the program to be reproduced and displaying the decoded upper level pictures;

selecting a picture from among the displayed upper layer pictures, decoding lower layer pictures of the selected picture and displaying the selected picture with the lower layer pictures;

selecting a picture from among the displayed lower layer pictures;

determining a reproducing time of the selected picture; and determining a transport stream packet based on the determined reproducing time, and decoding an audio/video signal of the determined transport stream packet.

9. The method of claim 8, wherein:

if a Fast Forward (FF) operation mode is selected, the transport stream packets of I-pictures are sequentially decoded, and if a REWIND operation mode is selected, the transport stream packets of the I-pictures are decoded in an order of decreasing disc packet numbers.

10. The method of claim 8, further comprising:

displaying time information of the selected image relative to a time base of the program.

11. The method of claim 8, further comprising:

displaying a location of the selected image relative to a length of the program.

12. An image indexing apparatus comprising:

a storage unit which stores a program in units of transport stream packets;

a Transport Stream (TS) demultiplexing unit which demultiplexes the transport stream packets into audio streams and video streams;

a decoder unit which decodes the demultiplexed audio streams and video streams into audio data and video data, respectively;

a picture codec unit which encodes predetermined picture data among pictures decoded in the decoder unit if the operation mode is a store mode, and decodes the picture data stored in the storage unit if the operation mode is a reproducing mode; and a microprocessor unit which extracts transport stream (TS) packets of the program using a hierarchical level of the program, stores picture data encoded in the picture codec unit and automatically indexes the picture data hierarchically at each predetermined time according to the hierarchical level of the program if the operation mode is a store mode, and hierarchically displays the picture data stored in the storage unit on a screen and outputs transport stream packets based on the selected picture data to the TS demultiplexing unit if the operation mode is the reproducing mode, wherein hierarchical indexing of picture data correlates picture data and the storage location of the TS packets corresponding to the picture data according to one or plurality of index levels which define a reproduction sequence of the TS packets, wherein the hierarchical indexing and picture data are stored in the storage unit, wherein the TS packets are stored in the storage unit along with picture data including a plurality of still pictures which are indexed to the TS packets according to one or a plurality of index levels which define the reproduction sequence of the TS packets, wherein the decoder decodes still pictures, and wherein the microprocessor unit controls the storage unit and the decoder unit to display an image on a display, the image graphically representing a sequential relationship between stored TS packets corresponding to the decoded still pictures.

13. The image indexing apparatus of claim 12, further comprising a memory which stores streams output from the TS demultiplexing unit and picture data output from the picture codec unit.

14. An apparatus for storing and image indexing a video of a program comprising transport stream (TS) packets, the apparatus comprising:

a storage unit which stores the TS packets of the video of the program;

a demultiplexer which demultiplexes the TS packets into video streams;

a decoder unit which decodes the demultiplexed video streams into video data;

a picture encoder which encodes selected I-pictures of the video data into still picture data; and a microprocessor unit which controls the storage unit to extract transport stream (TS) packets of the program using a hierarchical level of the program, and which controls the storage unit, the demultiplexer, the decoder and the encoder to store the TS packets, and index data which correlates the still picture data and a storage location of TS packets corresponding to the still picture data according to the hierarchical level of the program, wherein the storage unit stores still picture data and index data which automatically correlates the still picture data and the storage location of the TS packets corresponding to the still picture data according to one or plurality of index levels which define a reproduction sequence of the TS packets, wherein the TS packets are stored in the storage unit along with picture data including a plurality of still pictures which are indexed to the TS packets according to one or a plurality of index levels which define the reproduction sequence of the TS packets, wherein the decoder decodes still pictures, and wherein the microprocessor unit controls the storage unit and the decoder unit to display an image on a display, the image graphically representing a sequential relationship between stored TS packets corresponding to the decoded still pictures.

15. The apparatus of claim 14, wherein the index data of each still picture comprises:

an identifier corresponding to the one or the plurality of index levels; and a relative sequence in the video of the digital broadcast program of the TS packet corresponding to the still picture.

16. The apparatus of claim 15, wherein the identifier further defines a relationship between a first still picture corresponding to one of the plurality of index levels and a second still picture corresponding to another of the plurality of index levels, wherein the second still picture follows the first still picture in a reproduction sequence.

17. An apparatus for reproducing a video program comprising transport stream (TS) packets, wherein the TS packets are stored along with a plurality of still pictures and data which indexes the still pictures to the TS packets according to one or a plurality of index levels which define a reproduction sequence of the TS packets, the apparatus comprising:
- a storage unit which stores the TS packets, the plurality of still pictures and data which indexes the still pictures to the TS packets according to the one or plurality of index levels which define the reproduction sequence of the TS packets;
- a decoder unit which decodes the still pictures; and
- a microprocessor unit which controls the storage unit and the decoder unit to display an image on a display, the image graphically representing a sequential relationship between stored TS packets corresponding to the decoded still pictures.

18. The apparatus of claim 17, wherein the displayed image comprises a plurality of still pictures corresponding to one of the plurality of index levels.

19. The apparatus of claim 17, wherein the displayed image comprises a first plurality of still pictures corresponding to a first of the plurality of index levels and a second plurality of pictures corresponding to a second of the plurality of index levels, wherein the second plurality of pictures is sequentially between a first still picture of the first plurality of still pictures and a second still picture of the first plurality of still pictures during a reproduction of corresponding TS packets.

* * * * *